United States Patent
Antonatos et al.

(10) Patent No.: US 10,614,236 B2
(45) Date of Patent: Apr. 7, 2020

(54) SELF-CONTAINED CONSISTENT DATA MASKING

(71) Applicant: INTERNATIONAL BUSINESS MACHINES CORPORATION, Armonk, NY (US)

(72) Inventors: Spyridon Antonatos, Dublin (IE); Stefano Braghin, Dublin (IE); Ioannis Gkoufas, Dublin (IE); Pol Mac Aonghusa, Kildare (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 201 days.

(21) Appl. No.: 15/446,213

(22) Filed: Mar. 1, 2017

(65) Prior Publication Data

US 2018/0253562 A1 Sep. 6, 2018

(51) Int. Cl.
*G06F 21/62* (2013.01)
(52) U.S. Cl.
CPC .................. *G06F 21/6218* (2013.01)
(58) Field of Classification Search
CPC ............. G06F 21/6218; G06F 21/6227; G06F 21/6245; G06F 21/6254; G06F 21/60
USPC .......................................................... 726/30
See application file for complete search history.

(56) References Cited

U.S. PATENT DOCUMENTS

| | | | |
|---|---|---|---|
| 8,700,918 B2 | 4/2014 | Sabapathy et al. | |
| 8,813,247 B1 * | 8/2014 | Alten | G06F 21/31 380/45 |
| 8,826,448 B2 * | 9/2014 | Peckover | G06F 21/6245 713/193 |
| 9,720,943 B2 * | 8/2017 | Mattsson | G06F 16/221 |
| 2008/0288548 A1 * | 11/2008 | Lawler | G06F 21/6227 |
| 2010/0030795 A1 * | 2/2010 | Pattabhi | G06F 17/3051 707/757 |
| 2010/0122083 A1 * | 5/2010 | Gim | G06F 21/6245 713/162 |
| 2010/0306854 A1 * | 12/2010 | Neergaard | G06F 21/6254 726/26 |
| 2011/0314278 A1 | 12/2011 | Taskaya et al. | |
| 2013/0268750 A1 * | 10/2013 | Furukawa | G06F 21/6218 713/153 |
| 2014/0046927 A1 * | 2/2014 | Nelke | G06F 17/30336 707/713 |
| 2014/0304398 A1 | 10/2014 | Carlen et al. | |
| 2015/0324607 A1 * | 11/2015 | Mushkatblat | G06F 21/6254 726/26 |

(Continued)

OTHER PUBLICATIONS

"Camouflage Software Announces Data Masking for Big Data," Camouflage Software Inc., https://datamasking.com, Nov. 14, 2014 (3 pages).

(Continued)

*Primary Examiner* — Lynn D Feild
*Assistant Examiner* — Abdullah Almamun
(74) *Attorney, Agent, or Firm* — Griffiths & Seaton PLLC (57) ABSTRACT

Embodiments for performing self-contained, consistent data masking in a distributed computing environment by a processor. A data masking operation is performed on one or more datasets in one of a plurality of data formats such that a key of each value of each key-value pair representing a common set of columns or paths for the one or more datasets is masked.

15 Claims, 9 Drawing Sheets

(56) References Cited

U.S. PATENT DOCUMENTS

| | | |
|---|---|---|
| 2016/0134595 A1 | 5/2016 | Lavinio |
| 2016/0210470 A1* | 7/2016 | Rozenberg ........ G06F 17/30315 |
| 2016/0300075 A1* | 10/2016 | Stankiewicz ....... G06F 21/6245 |
| 2017/0104746 A1* | 4/2017 | Nair ...................... H04L 63/083 |
| 2017/0193026 A1* | 7/2017 | Pettovello ........... G06F 12/1408 |

OTHER PUBLICATIONS

Lane, "Understanding and Selecting Data Masking Solutions: Creating Secure and Useful Data," Securosis, LLC, https://securosis.com/assets/library/.../UnderstandingMasking_FinalMaster_V3.pdf, Version 1.0, Aug. 10, 2012 (33 pages).

* cited by examiner

SELF-CONTAINED CONSISTENT DATA MASKING

BACKGROUND OF THE INVENTION

Field of the Invention

The present invention relates in general to computing systems, and more particularly to, various embodiments for performing self-contained, consistent data masking in a distributed computing environment using one or more computing processors.

Description of the Related Art

Computing systems may be found in the workplace, at home, or at school. Computer systems may include data storage systems, or disk storage systems, to process and store data. For example, many businesses, organizations, educational institutions, or governmental agencies need to share data with various constituents for a variety of business, educational, and/or governmental purposes, while also protecting sensitive or identifiable aspects of the information.

As the technology field grows exponentially each year, an ever-growing amount of critical data are generated, collected and shared by individuals and organizations. Consequently, the need for advancement in the techniques for efficiently and consistently protecting the privacy of the individuals represented by such data is paramount. At the same time, it is of great importance to preserve as much information as possible in order to preserve the business value of the data itself.

SUMMARY OF THE INVENTION

Various embodiments for performing self-contained, consistent data masking in a distributed computing environment by a processor, are provided. In one embodiment, by way of example only, a method for performing self-contained, consistent data masking in a distributed computing environment, again by a processor, is provided. A data masking operation is performed on one or more datasets in one of a plurality of data formats such that a key of each value of each key-value pair representing a common set of columns or paths for the one or more datasets is masked.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As described herein, a data masking operation may be the process whereby the information, data, and/or data in a database is masked or de-identified to ensure the protection of sensitive information while protecting the utility of the data without risk of unnecessarily exposing sensitive information. That is, data masking may be a process of obscuring (masking) specific data elements within a data store. Data masking may enable data to be replaced with realistic but not real data. In one aspect, data masking may obscure sensitive data in order that sensitive data is not available outside of the authorized environment. Data masking may be performed while provisioning non-production environments, so that data used to support test and development processes are not exposing sensitive data. In short, data masking may include creating a structurally similar version of data that cannot be linked to the original data and that may be used for one or more purposes, such as, for example, application training and/or training. Data masking may protect actual data while having the functional substitute of the actual data when the actual data is not needed.

In one aspect, data masking may be an operation for privacy-preserving data sharing. Consistent data masking maximizes utility of the masked dataset as it preserves better its statistical value. Consistent data masking may be masking data objects consistently across a plurality of different data resources to protect privacy.

Accordingly, various embodiments provide a solution for performing consistent masking of a dataset (e.g., healthcare data or dataset) in a distributed environment, for either single attribute and/or a plurality of attributes in the dataset, without the requirement of an external mapping service. In one aspect, the present invention makes no assumptions on the masking operations that are applied on the data, which is contrary to the requirement to be deterministic, as well as the underlying hardware infrastructure. The present invention may perform consistent data masking in a distributed fashion by using one or more data masking operations, while alleviating the requirement of a mapping service. More specifically, the present invention provides for various embodiments for performing self-contained, consistent data masking in a distributed computing environment by a processor. In one embodiment, a data masking operation is performed on one or more datasets in one of a plurality of data formats such that a key of each value of each key-value pair representing a common set of columns or paths for the one or more datasets is masked.

In this way, the present invention provides increased efficiency for consistent data masking without having to rely: (i) on a service that stores mapping between the original and fictionalized values and/or (ii) using deterministic masking operators. Additional benefits and advantages include increased efficiency of consistent data masking without a) having to operate in a single machine environment, b) rely on centralized/distributed mapping services which can lead to privacy breaches if accidentally disclosed, c) rely on deterministic masking operations, such as hashing and/or encryption (with predefined keys) operation, which deteriorates the statistical value of the data, and/or d) rely on pre-defined mappings. Thus, by not relying on either centralized or distributed mapping services, consistent data masking is enhanced, scalability, usability and portability to a distributed environment is increased.

Moreover, the present invention performs distributed, parallel, data masking operations ensuring consistency without the need of a mapping service, and may be applied to both structured and unstructured data. In one aspect, the distributed, parallel, data masking operations may be applied to both structured and unstructured data upon identifying the elements of each type of data or data file, such as, for example, records, objects, and/or documents (such as using column/record identifier, x-path or JavaScript Object Notion ("JSON")-path). The present invention may be applied in a distributed system providing a map-reduced framework such as, for example, a distributed file system ("DFS") or leverages a distributed execution engine (e.g., Apache Spark™) employing replication (e.g., Hadoop Distributed File System "HDFS") in order to process the dataset in a distributed fashion. Map reduced operations may be exploited to partition and distribute the data across different nodes of the DFS system in such a way that the data masking operations may be performed consistently per attribute and/or value combination. A reconstruction phase of the masked data may be performed for building the masked dataset to be delivered to a user.

It is understood in advance that although this disclosure includes a detailed description on cloud computing, implementation of the teachings recited herein are not limited to a cloud-computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
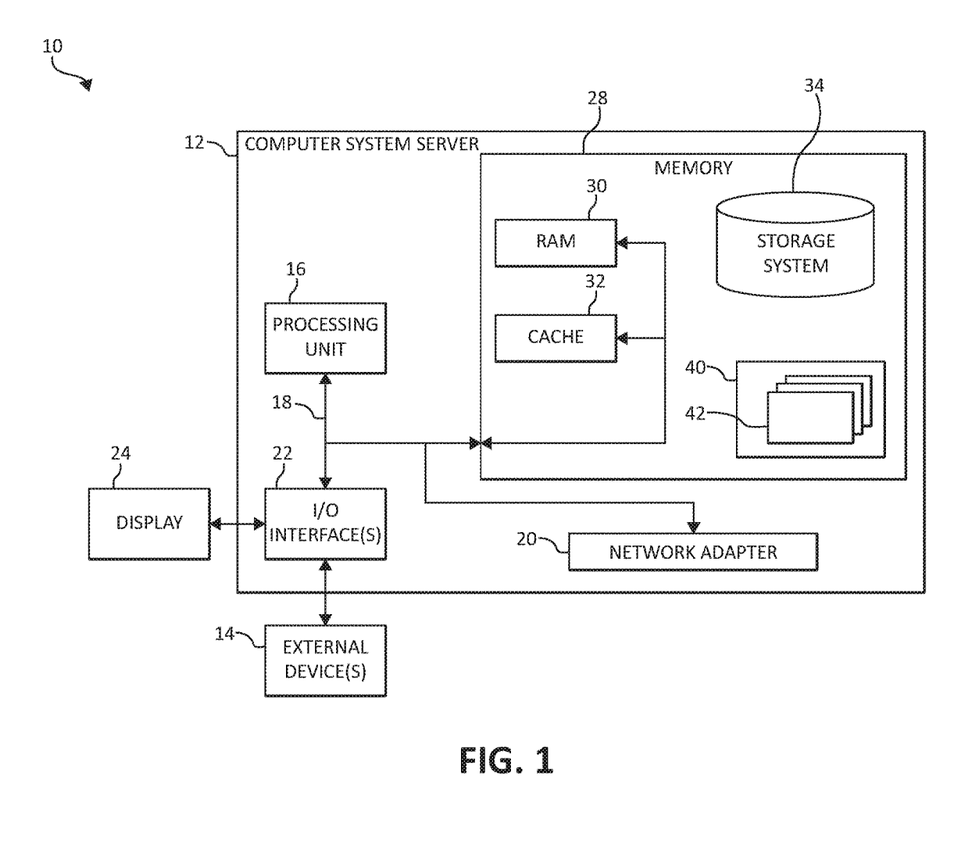
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 12.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
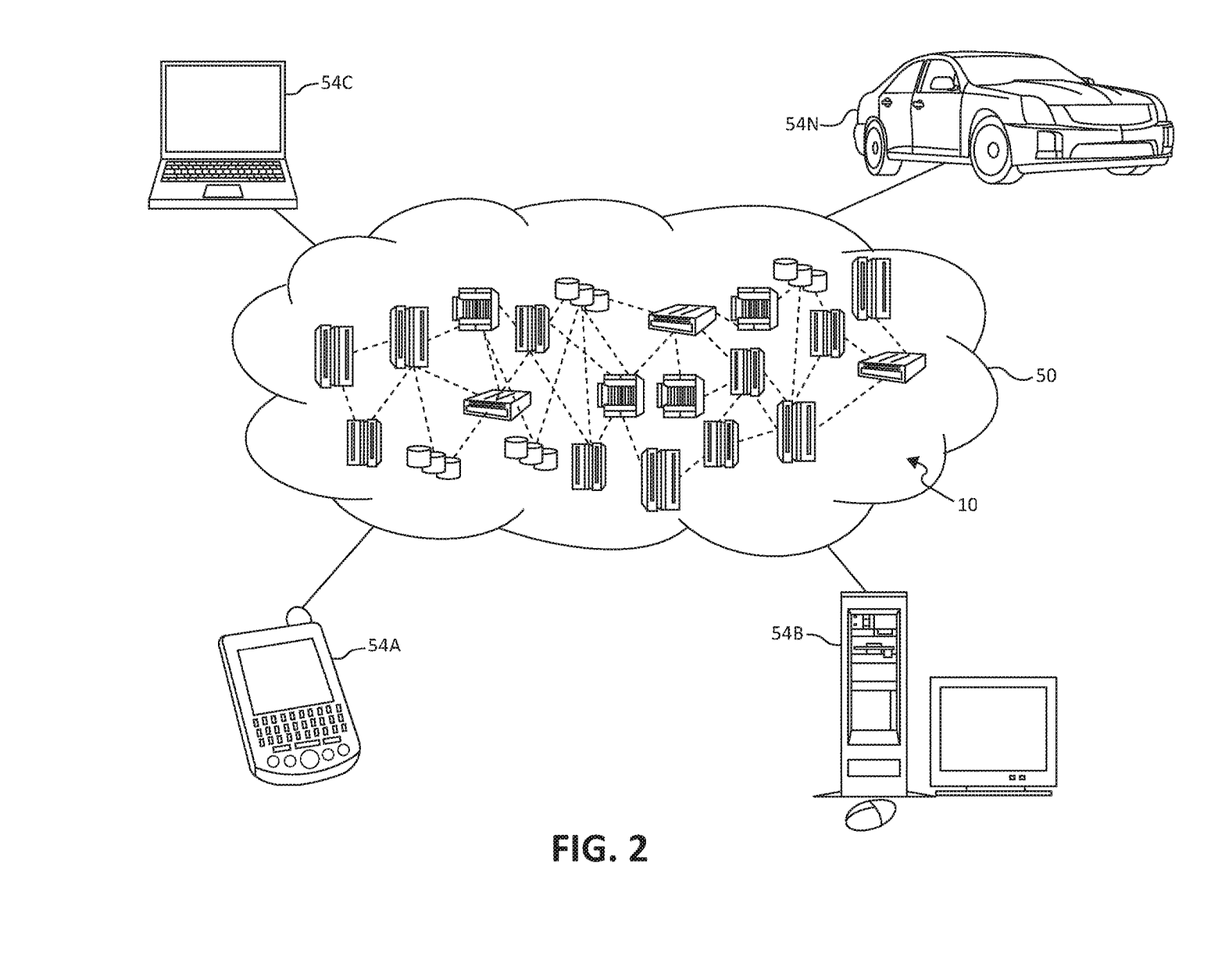
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
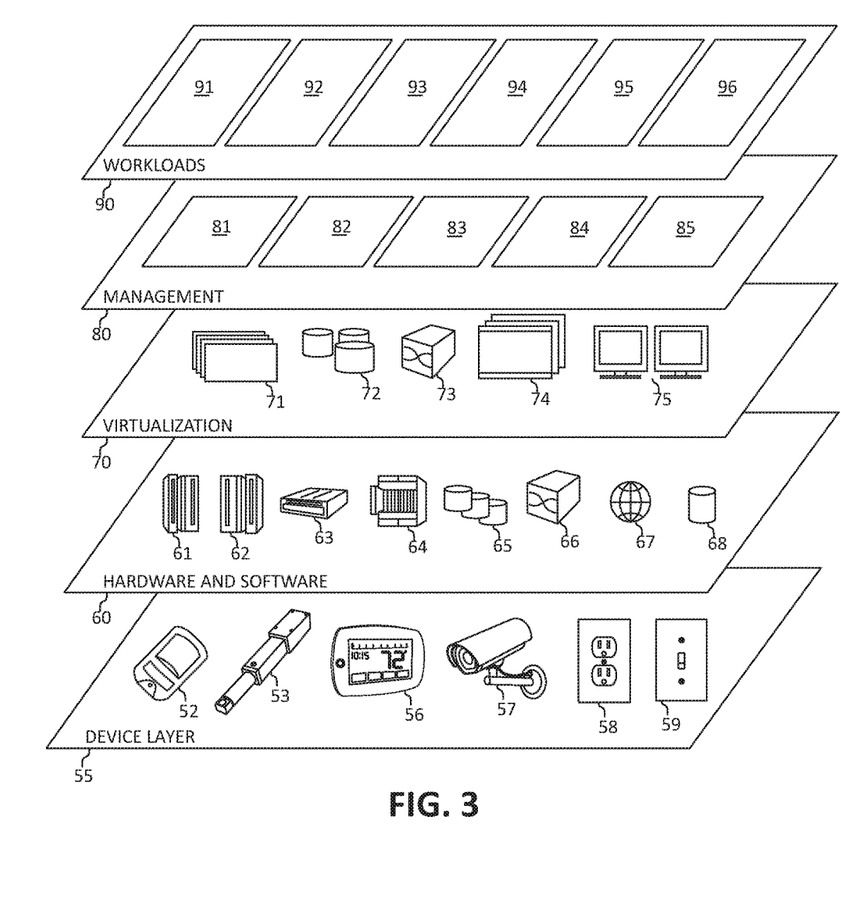
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various consistent data masking workloads and functions 96. In addition, consistent data masking workloads and functions 96 may include such operations as data analytics, data analysis, and as will be further described, notification functionality. One of ordinary skill in the art will appreciate that the consistent data masking workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
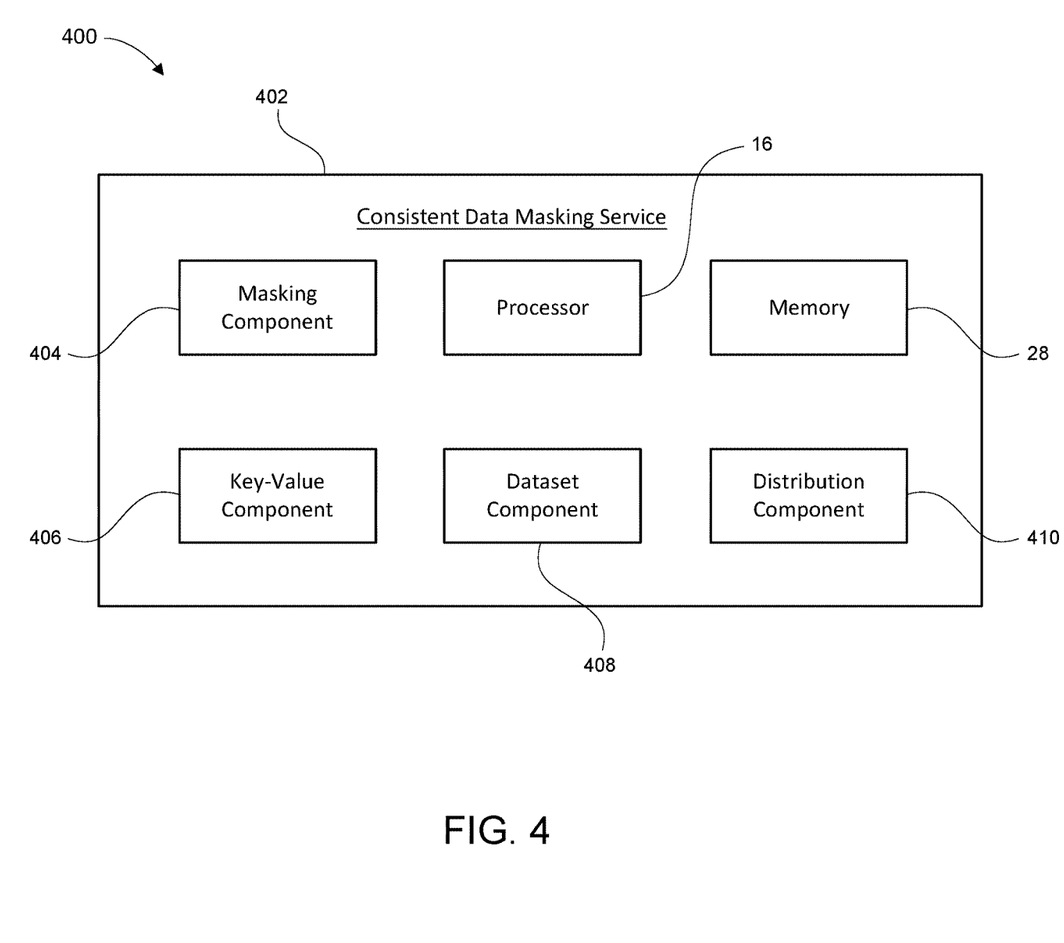
FIG. 4 is an additional block diagram depicting various user hardware and computing components functioning in accordance with aspects of the present invention.

Turning to FIG. 4, a block diagram of various hardware 400 equipped with various functionality as will be further described is shown in which aspects of the mechanisms of the illustrated embodiments may be realized. In one aspect, one or more of the components, modules, services, applications, and/or functions described in FIGS. 1-3 may be used in FIG. 4. For example, computer system/server 12 of FIG. 1 may be included in FIG. 4 and may be connected to other computing nodes (such as computer systems of vehicles) over a distributed computing network, where additional data collection, processing, analytics, and other functionality may be realized. The components of computer system/server 12 may include, but are not limited to, one or more processors or processing units 16, a system memory 28, and a bus 18 that couples various system components including system memory 28 to processor 16.

The computer system/server 12 of FIG. 1, may include consistent data masking service 402, along with other related components in order to apply data masking operations on datasets that may be in the form of records, objects, and/or documents, wherein each record or object or document may include values for a common set of columns or paths. The consistent data masking service 402 may perform data masking operations without using any deterministic or external mapping based services.

The data masking service 402 may include a data masking ("masking") component 404, a key-value component 406, a dataset component 408, and a distribution component 410.

The dataset component 408 may include one or more datasets. The datasets may be in one of a plurality of dataset formats such as, for example, records, objects, and/or documents, that may also include unique record, object, and/or document identifiers for each of the datasets.

The data masking component 404 may perform data masking operations without using any deterministic or external mapping based services. The data masking component 404 may perform a data masking operation on one or more datasets, such as those associated with the dataset component 408, in one of a plurality of data formats such that a key of each value of each key-value pair representing a common set of columns or paths for the one or more datasets is masked.

The key-value component 406 may create and/or generate key-value pairs in a key-value generation phase where the key is the value to be masked (for one or more datasets in a structured or unstructured format), and the value is a tuple of the form column name or path, record, object, and/or document, or reference to the records, objects, and/or documents, and unique record, object, and/or document identifier.

The distribution component 410 may distribute the key-value pairs generated by the key-value generation phase, in a partition phase, to one or more worker threads. The masking component may include and/or be associated with one or more worker threads (not shown for illustrative convenience). The data masking component 404 and/or the worker threads may apply the data masking operations in a masking phase to the keys (for one or more datasets in a structured or unstructured format) distributed during the partition phase. Original values (e.g., base values, predefined values, default values, and the like) may be substituted, by the masking component 404, in the records, objects, and/or documents (e.g., the one or more datasets in a structured or unstructured format), specified by column or path information with the value produced by the masking phase.

Figure 5:
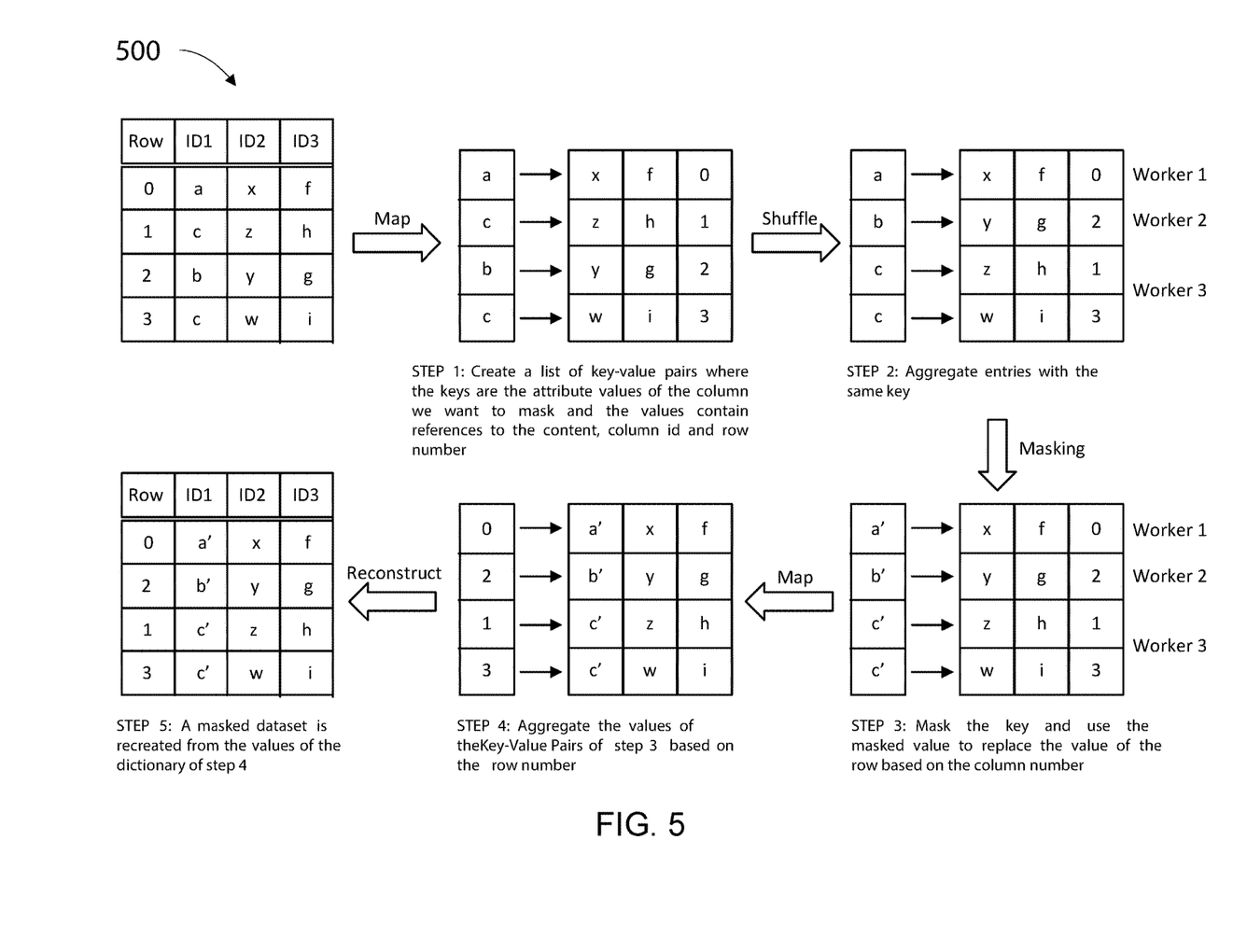
FIG. 5 is an additional block diagram depicting flow operations for consistently masking one attribute in accordance with aspects of the present invention.

Turning now to FIG. 5, a block diagram depicts flow operations 500 for consistently masking one attribute. A dataset containing three attributes (ID1, ID2, ID3) and four rows is depicted. The first column of a table, labeled "Row", is depicted for illustrative convenience and reference and may represent a row number. Assume that a single attribute such as, for example, attribute ID1 is to be masked.

In summary, the flow operations 500 may include steps 1-5. Step 1 may include creating a list of key-value pairs where the keys are the attribute values of the column (e.g., ID1) that is intended to be masked. Each row of a dataset may be mapped in such a way that the content of the attribute such as, for example, attribute ID1 is used as key in a key-value pair. The values may contain references to the content, column identification (ID), and/or the row number. The value may consist of the content of the attributes not involved in the masking and the column number.

Step 2 may include aggregating one or more entries with a same key. In step 2, the key-value pairs obtained in step 1 may be shuffled and distributed to one or more various workers such as, for example, workers 1-3 in such a way that key-value pairs with a same key are assigned to the same worker. It should be noted that in this example no worker receives more than one key (but more than one key may be received). If, for example, there would have been only two workers, one worker may receive both pairs with "c" as a key and the other worker may receive the remaining pairs.

Step 3 may include masking the key and using the masked value to replace/substitute the value of the row based on the column number. In step 3, the masking function may be applied to the keys of the key-value pairs. This is done in such a way that a new fictionalized value is computed per distinct key. Therefore, both "c" keys are masked as c'.

Step 4 may include aggregating the values of the key-value pairs (or dictionary) of step 3 based on the row number. The dictionary may be a data structure that contains mappings between keys and values. In step 4, the records may be reconstructed transforming the key-value pairs. This transformation may include reconstructing the row of the dataset in such a way that the key is the row number and the value component is the new row of the dataset. This means that each attribute value is in the same position/order as in the original dataset.

Step 5 may include recreating the masked dataset from the values of the dictionary of step 4. That is, in step 5, all the key-value pairs may be written as a new, masked, dataset. It should be noted that the order in which the rows are written in the new dataset might differ from the order in the original one, but this can be trivially corrected applying a sorting function on the keys obtained from step 4 or on the row numbers.

Figure 6:
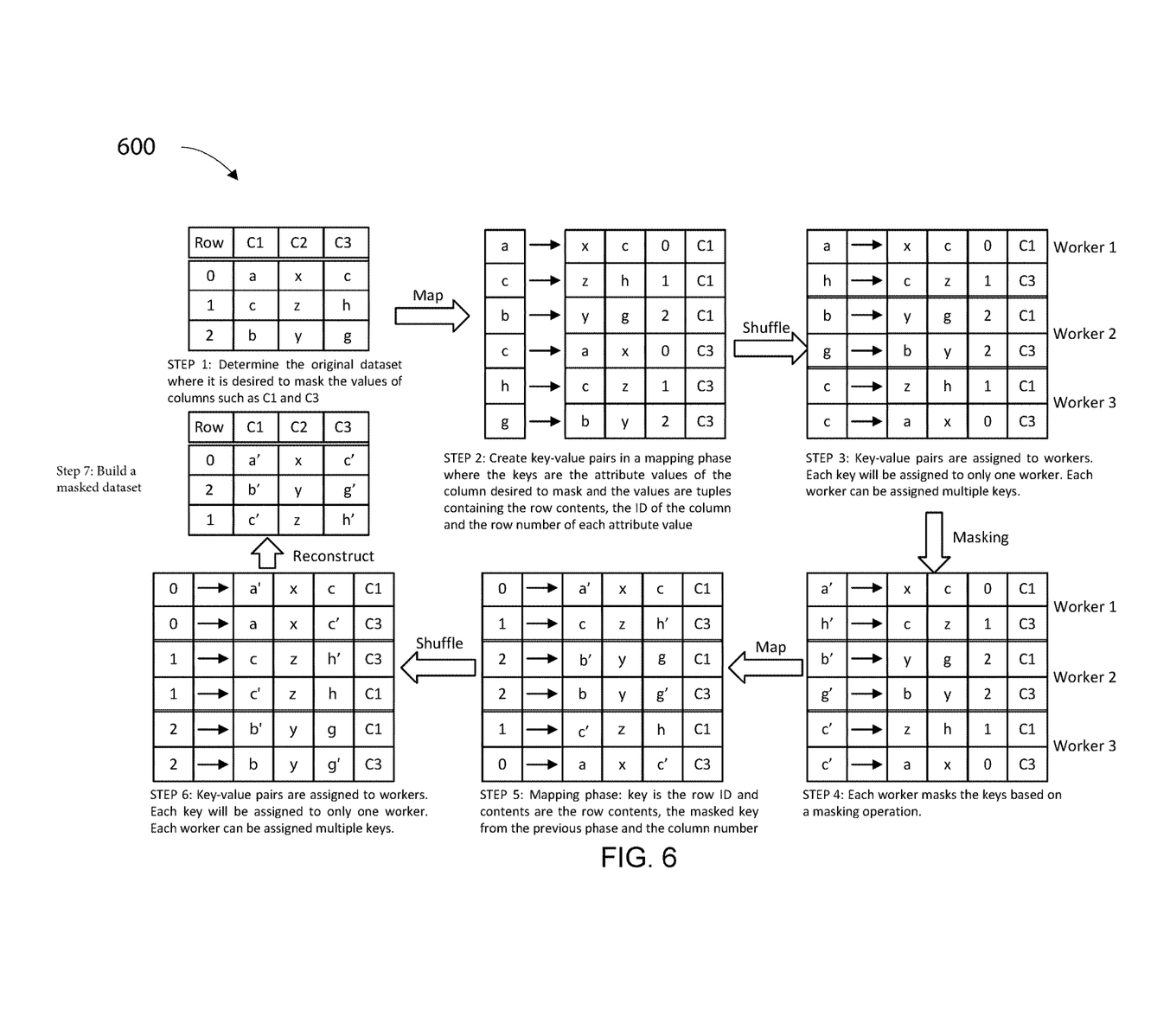
FIG. 6 is an additional block diagram depicting flow operations for consistently masking on two or more attributes in accordance with aspects of the present invention.

Turning now to FIG. 6, a block diagram depicts flow operations 600 consistently masking on two or more attributes in a distributed computing environment. That is, FIG. 6 illustrates a procedure to apply consistent data masking on two or more attributes, which may be required to be treated together. For example, consistent data masking on two or more attributes may be applied to a medical record containing, among its various attributes, patient name and practitioner name. A person can be both patient and medical practitioner in different situations and it may be desired to preserve the link between such attributes.

It should be noted, that flow operations 600 is different from masking two (or more) attributes independently, as in FIG. 5 (apply data masking on a single attribute) where the procedure can sequentially apply the procedure described in FIG. 5 two or more times.

As depicted in FIG. 6, a dataset in the example may consist of three rows with three records (e.g., C1, C2, and C3) each. Similar to the example of FIG. 5, the first column of the table, labeled "Row", is just for illustration purposes only for identifying the row number and it is not part of the datasets. FIG. 6 provides a solution for a request to consistently mask attributes C1 and C3.

In summary, the flow operations 600 may include steps 1-5. Step 1 may include identifying or determining an original dataset that is intended to mask the values of the columns such as, for example, columns "C1" and "C3". Step 1 may include mapping each row of the dataset to one or more key-value pairs. More precisely, mapping one key-value pair per attribute that is constrained to be consistently masked together. The key may be each key-value pair, which may consist of the content of one of the attributes to be masked. The value component may consist of the content of all the fields apart from the one used as the key, the row number, and/or the identifier of the attribute used as the key.

Step 2 may include creating key-value pairs in a mapping phase where the keys are the attribute values of the column (e.g., C1 and C3) that is intended to be masked and the values are tuples containing the row contents, identifier (ID) of the column (e.g., "C1" and "C3"), and/or a row number of each attribute value. Step 2 may also include shuffling the key-value pairs obtained from step 1 and distributing the key-value pairs to the various workers in such a way that pairs with the same key are assigned to the same worker.

Step 3 may include assigning key-value pairs to workers such as, for example, worker threads 1-3. Each key may be assigned to only one worker. Each worker may be assigned multiple keys. That is, step 3 may apply the masking function to each key in a consistent manner by invoking the function for each distinct key and applying the same obtained value to the same key.

In step 4, each worker may mask the keys based on a data masking operation. Step 4 may transform the data by substituting or "swapping" the key of each key-value pair with the row number contained in the value.

In step 5, in a mapping phase, the key may be a row ID, the contents may be the row contents, and/or the masked key from a previous mapping phase and column number.

In step 6, the key-value pairs may be assigned to workers. That is, key-value pairs are again shuffled and distributed to the various workers in such a way that the same key (row number in this case) is assigned to the same worker. Each key may be assigned to only one worker. Each worker may be assigned multiple keys. Having all the values for each row in the same worker, a final, masked, dataset may be built or created. To do that the content of the attributes of each row may be consolidated so that an original value is preserved unless there is a key-value pair, for the same key, which modifies an attribute.

Figure 7:
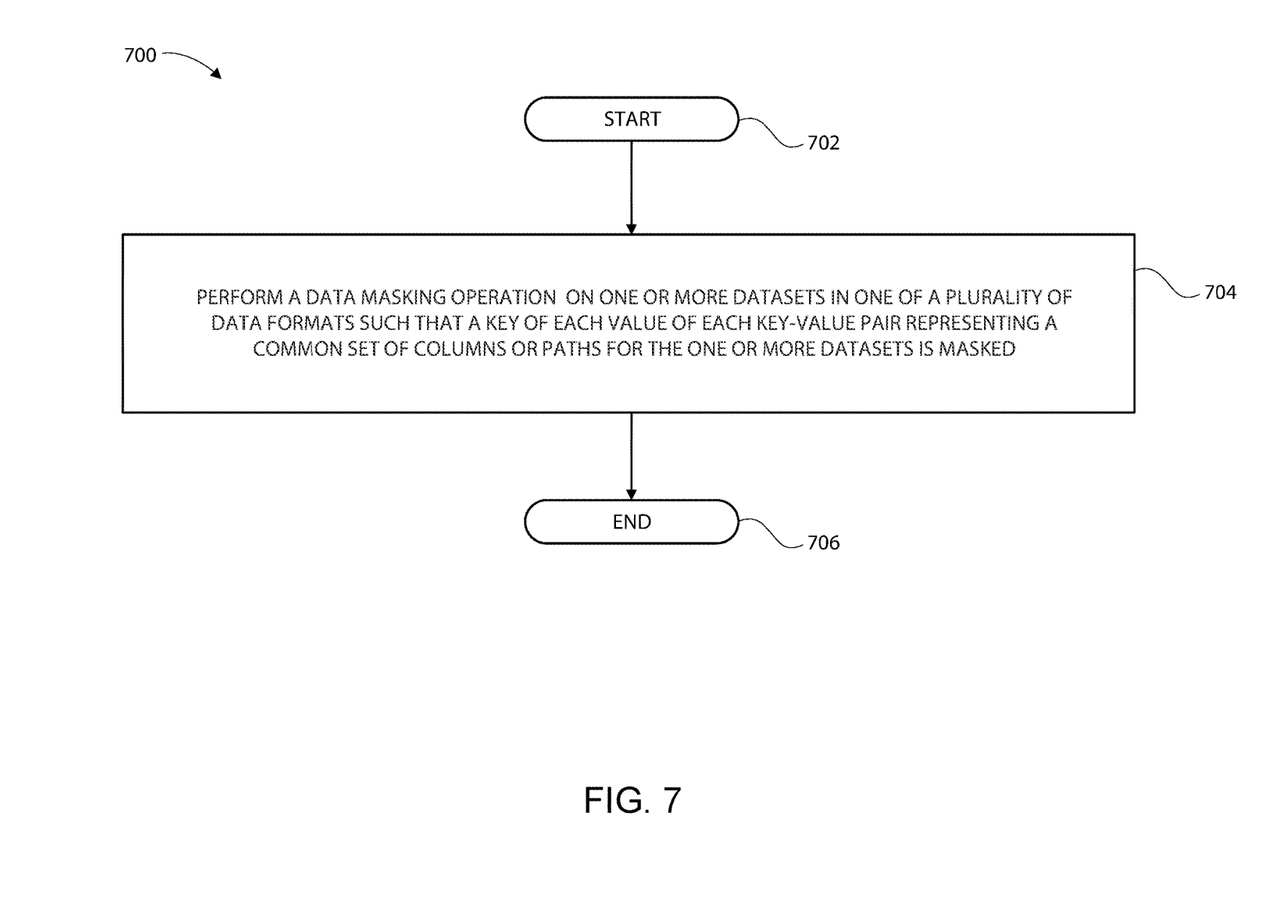
FIG. 7 is a flowchart diagram depicting an exemplary method for performing self-contained, consistent data masking in a distributed computing environment by a processor, again in which aspects of the present invention may be realized.

FIG. 7 is a flowchart diagram depicting an exemplary method for performing self-contained, consistent data masking in a distributed computing environment. The functionality 700 may be implemented as a method executed as instructions on a machine, where the instructions are included on at least one computer readable medium or one non-transitory machine-readable storage medium. The functionality 700 may start in block 702. A data masking operation is performed on one or more datasets in one of a plurality of data formats such that a key of each value of each key-value pair representing a common set of columns or paths for the one or more datasets is masked, as in block 704. The functionality 700 may end, as in block 706.

Figure 8:
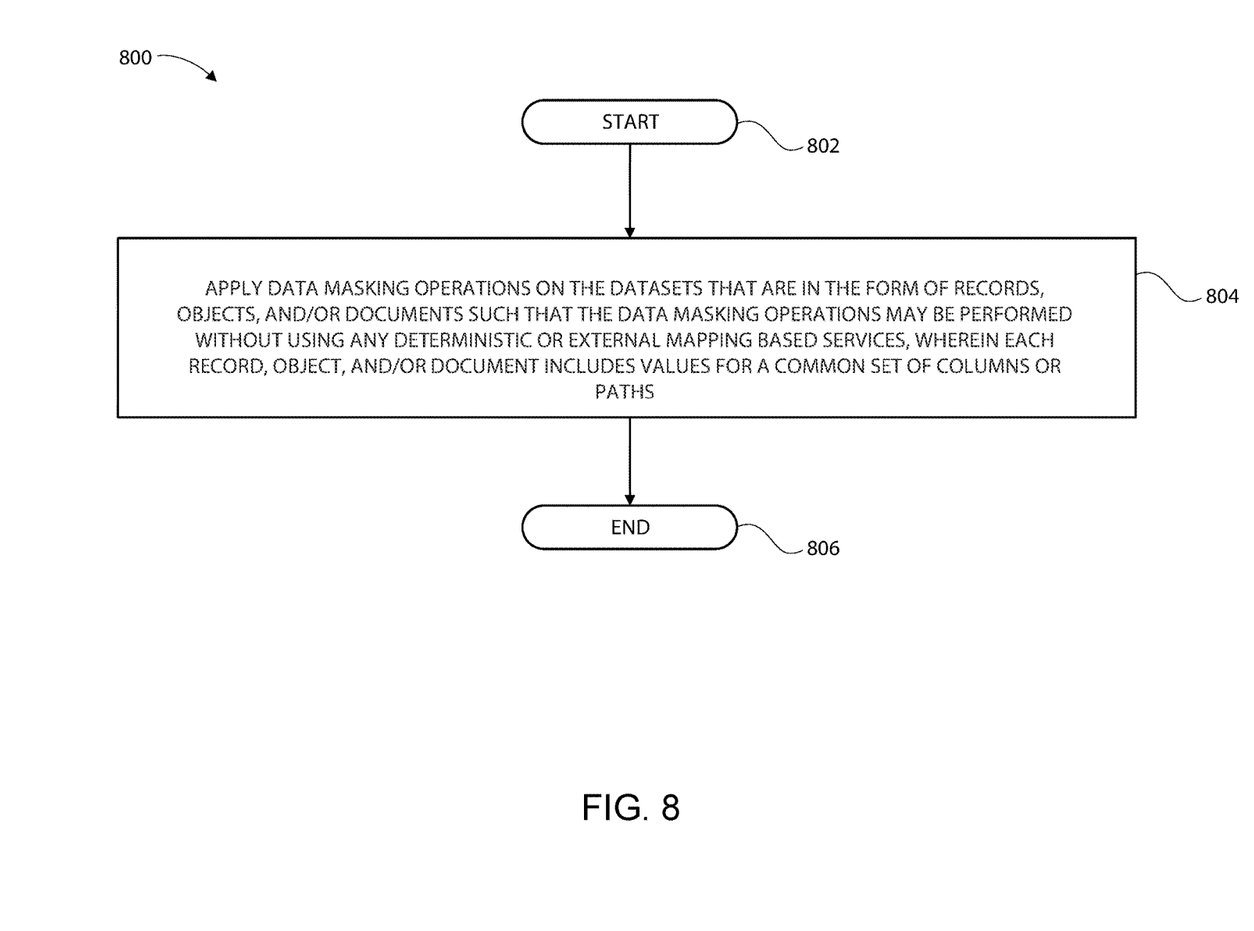
FIG. 8 is a flowchart diagram depicting an additional exemplary method for performing self-contained, consistent data masking in a distributed computing environment by a processor, again in which aspects of the present invention may be realized.

FIG. 8 is a flowchart diagram depicting an exemplary method for performing consistent data masking in a distributed computing environment. The functionality 800 may be implemented as a method executed as instructions on a machine, where the instructions are included on at least one computer readable medium or one non-transitory machine-readable storage medium. The functionality 800 may start in block 802. Data masking operations may be applied on one or more datasets that are in the form of records, Objects, and/or documents such that the data masking operations may be performed without using any deterministic or external mapping based services, wherein each record, object, and/or document includes values for a common set of columns or paths, as in block 804. The functionality 800 may end, as in block 806.

Figure 9:
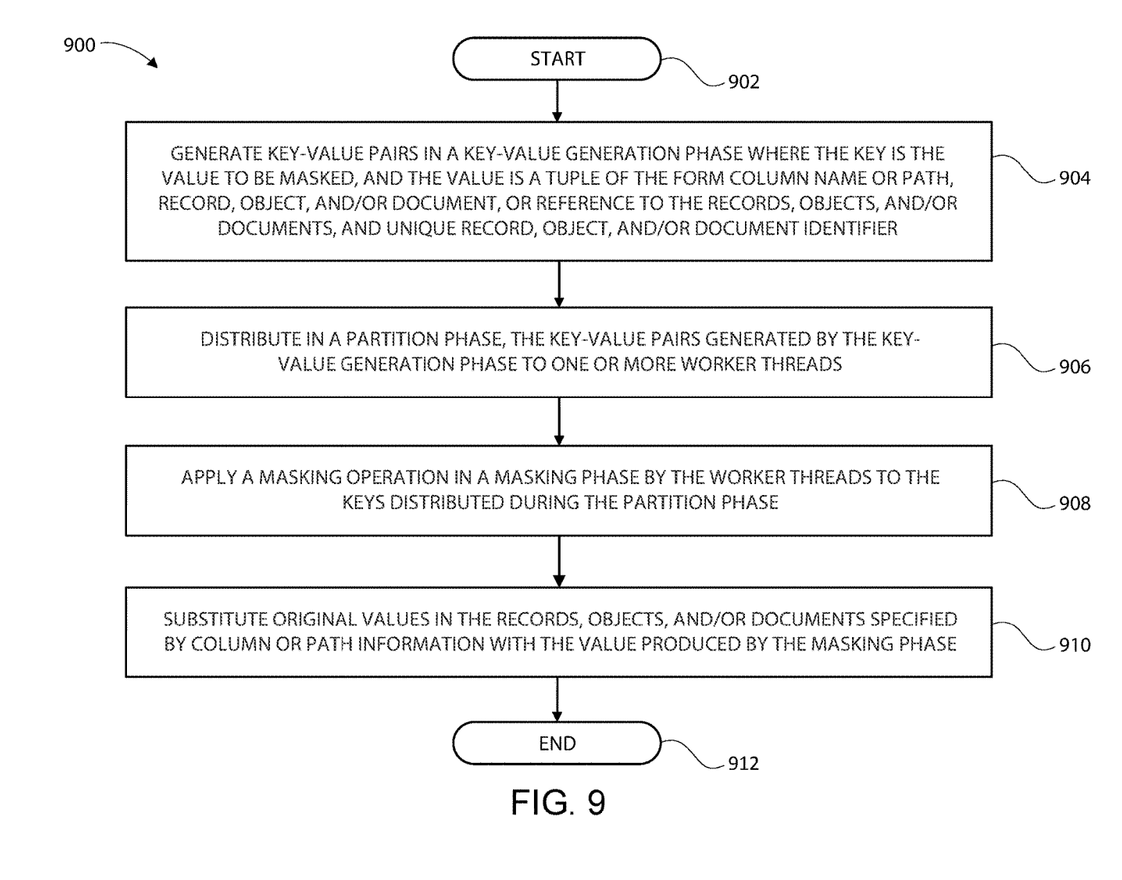
FIG. 9 is a flowchart diagram depicting an exemplary method for performing self-contained, consistent data masking in a distributed computing environment by a processor, again in which aspects of the present invention may be realized.

FIG. 9 is a flowchart diagram depicting an exemplary method for performing consistent data masking in a distributed computing environment. The functionality 900 may be implemented as a method executed as instructions on a machine, where the instructions are included on at least one computer readable medium or one non-transitory machine-readable storage medium. The functionality 900 may start in block 902. Key-value pairs may be generated in a key-value generation phase where the key is the value to be masked (for one or more datasets in a structured or unstructured format), and the value is a tuple of the form column name or path, record, object, and/or document, or reference to the records, objects, and/or documents, and unique record, object, and/or document identifier, as in block 904. The key-value pairs generated by the key-value generation phase may be distributed, in a partition phase, to one or more worker threads, as in block 906. A masking operation may be applied in a masking phase by the worker threads to the keys (for one or more datasets in a structured or unstructured format) distributed during the partition phase, as in block 908. Original values (e.g., base values, predefined values, default values, and the like) may be substituted in the records, objects, and/or documents (e.g., the one or more datasets in a structured or unstructured format) specified by column or path information with the value produced by the masking phase, as in block 910. The functionality 900 may end, as in block 912.

In one aspect, in conjunction with and/or as part of at least one block of FIGS. 7-9, the operations of methods 700, 800, and/or 900 may include each of the following. The operations of methods 700, 800, and/or 900 may generate each key-value pair in a key-value generation phase, wherein the value of each key-value pair is a tuple having a column name, one of the plurality of data formats, a reference to the one of the plurality of data formats, an identifier to the one or more datasets, or a combination thereof, and distribute each key-value pair to one or more worker threads.

The operations of methods 700, 800, and/or 900 may process a key of a key-value pair by the one or more worker threads assigned to the key-value pair, and/or process the data masking operation by one or more worker threads to each key of the key-value pairs while distributing each key-value pair to the one or more worker threads. Original values of the one or more datasets in one of the plurality of data formats may be substituted with the value of each key-value pair. A self-contained data masking operation may be performed on a key of a key-value pair assigned to the one or more datasets in one of a plurality of data formats without performing a deterministic operation or external mapping operation. The plurality of data formats may be structured data, unstructured data, or a combination thereof.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for performing self-contained, consistent data masking in a distributed computing environment, comprising:
    performing a data masking operation on one or more datasets in one of a plurality of data formats such that a key of each value of each key-value pair representing a common set of columns or paths for the one or more datasets is masked;
    wherein the data masking operation comprises a self-contained data masking operation generated by a map reduce operation on a distributed execution engine without performing a deterministic operation utilizing hashing and encryption or an external mapping operation utilizing a mapping between original and masked values of the one or more datasets;
    distributing each key-value pair to one or more worker threads; and
    processing a key of a key-value pair by the one or more worker threads assigned to the key-value pair.

2. The method of claim 1, further including generating each key-value pair in a key-value generation phase, wherein the value of each key-value pair is a tuple having a column name, one of the plurality of data formats, a reference to the one of the plurality of data formats, an identifier to the one or more datasets, or a combination thereof.

3. The method of claim 1, further including performing the data masking operation by one or more worker threads to each key of the key-value pairs while distributing each key-value pair to the one or more worker threads.

4. The method of claim 1, further including substituting original values of the one or more datasets in one of the plurality of data formats with the value of each key-value pair.

5. The method of claim 1, wherein the plurality of data formats include structured data, unstructured data, or a combination thereof.

6. A system for self-contained, consistent data masking in a distributed computing environment, comprising:
    one or more computers with executable instructions that when executed cause the system to:
    perform a data masking operation on one or more datasets in one of a plurality of data formats such that a key of each value of each key-value pair representing a common set of columns or paths for the one or more datasets is masked;
    wherein the data masking operation comprises a self-contained data masking operation generated by a map reduce operation on a distributed execution engine without performing a deterministic operation utilizing hashing and encryption or an external mapping operation utilizing a mapping between original and masked values of the one or more datasets;
    distribute each key-value pair to one or more worker threads; and process a key of a key-value pair by the one or more worker threads assigned to the key-value pair.

7. The system of claim 6, wherein the executable instructions that when executed cause the system to generate each key-value pair in a key-value generation phase, wherein the value of each key-value pair is a tuple having a column name, one of the plurality of data formats, a reference to the one of the plurality of data formats, an identifier to the one or more datasets, or a combination thereof.

8. The system of claim 6, wherein the executable instructions that when executed cause the system to perform the data masking operation by one or more worker threads to each key of the key-value pairs while distributing each key-value pair to the one or more worker threads.

9. The system of claim 6, wherein the executable instructions that when executed cause the system to substitute original values of the one or more datasets in one of the plurality of data formats with the value of each key-value pair.

10. The system of claim 6, wherein the plurality of data formats include structured data, unstructured data, or a combination thereof.

11. A computer program product for, by a processor, performing self-contained, consistent data masking in a distributed computing environment, the computer program product comprising a non-transitory computer-readable storage medium having computer-readable program code portions stored therein, the computer-readable program code portions comprising:

an executable portion that performs a data masking operation on one or more datasets in one of a plurality of data formats such that a key of each value of each key-value pair representing a common set of columns or paths for the one or more datasets is masked;

wherein the data masking operation comprises a self-contained data masking operation generated by a map reduce operation on a distributed execution engine without performing a deterministic operation utilizing hashing and encryption or an external mapping operation utilizing a mapping between original and masked values of the one or more datasets;

an executable portion that distributes each key-value pair to one or more worker threads; and an executable portion that processes a key of a key-value pair by the one or more worker threads assigned to the key-value pair.

12. The computer program product of claim 11, further including an executable portion that generates each key-value pair in a key-value generation phase, wherein the value of each key-value pair is a tuple having a column name, one of the plurality of data formats, a reference to the one of the plurality of data formats, an identifier to the one or more datasets, or a combination thereof.

13. The computer program product of claim 11, further including an executable portion that
performs the data masking operation by one or more worker threads to each key of the key-value pairs while distributing each key-value pair to the one or more worker threads.

14. The computer program product of claim 11, further including an executable portion that substitutes original values of the one or more datasets in one of the plurality of data formats with the value of each key-value pair.

15. The computer program product of claim 11, wherein the plurality of data formats include structured data, unstructured data, or a combination thereof.

* * * * *